US010572725B1

(12) United States Patent
Becker et al.

(10) Patent No.: US 10,572,725 B1
(45) Date of Patent: Feb. 25, 2020

(54) FORM IMAGE FIELD EXTRACTION

(71) Applicants: Richard Becker, San Jose, CA (US); Kimia Hassanzadeh, San Jose, CA (US)

(72) Inventors: Richard Becker, San Jose, CA (US); Kimia Hassanzadeh, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 158 days.

(21) Appl. No.: 15/942,010

(22) Filed: Mar. 30, 2018

(51) Int. Cl.
*G06K 9/62* (2006.01)
*G06K 9/00* (2006.01)
*G06K 9/46* (2006.01)
*G06T 3/40* (2006.01)

(52) U.S. Cl.
CPC ..... *G06K 9/00449* (2013.01); *G06K 9/00463* (2013.01); *G06K 9/4652* (2013.01); *G06K 9/6269* (2013.01); *G06T 3/40* (2013.01); *G06K 2209/015* (2013.01)

(58) Field of Classification Search
CPC ............ G06K 9/00449; G06K 9/4652; G06K 9/6269; G06K 9/00463; G06K 2209/015; G06T 3/40
See application file for complete search history.

(56) References Cited

U.S. PATENT DOCUMENTS

| | | | | |
|---|---|---|---|---|
| 8,032,822 B1 * | 10/2011 | Artamonov | .......... | G06Q 40/123 704/9 |
| 2007/0208669 A1 * | 9/2007 | Rivette | .................. | G06Q 10/10 705/59 |
| 2013/0318426 A1 * | 11/2013 | Shu | ........................ | G06F 17/243 715/226 |
| 2014/0223284 A1 * | 8/2014 | Rankin, Jr. | ........... | G06F 17/248 715/234 |
| 2014/0348396 A1 * | 11/2014 | Laaser | ............... | G06K 9/00442 382/113 |
| 2016/0147762 A1 * | 5/2016 | Yu | ............................. | G06F 8/38 707/723 |
| 2018/0096060 A1 * | 4/2018 | Peled | .................... | G06F 16/353 |
| 2018/0373711 A1 * | 12/2018 | Ghatage | ............. | G06K 9/00456 |

OTHER PUBLICATIONS

H Nguyen et al., "Learning to Extract Form Labels" Proceedings of the VLDB Endowment, 2008.*
S.W.Lam et al., "Anatomy of a form reader", Proceedings of 2nd International Conference on Document Analysis and Recognition (ICDAR '93), pp. 506-509.*
Ujjwalkarn, "An Intuitive Explanation of Convoultional Neural Networks"; The Data Science Blog; machine learning, deep learning, npl, data science; Aug. 11, 2016 (22 pages).

* cited by examiner

*Primary Examiner* — Samir A Ahmed
(74) *Attorney, Agent, or Firm* — Ferguson Braswell Fraser Kubasta PC (57) ABSTRACT

Field extraction from a form image includes identifying a target field of the form image, defining a patch from the form image based on the target field, and encoding the patch using a color encoding scheme to obtain an encoded patch. Field extraction further includes applying a trained classifier to the encoded patch to identify a relationship between a field value and a field identifier, and extracting the field value from the form image according to the relationship.

20 Claims, 7 Drawing Sheets

FORM IMAGE FIELD EXTRACTION

BACKGROUND

Forms are widely used to provide a structured method for the entry of data. Specifically, forms are composed of fields. Fields include field value reserved space and field labels. The field labels describe, to a human operator, the type of information (i.e., field value) requested to be submitted into the field value reserved space. Often, humans submit information into forms by hand or print a form and sign by hand. Then, the human may scan or take a picture of the form to create a form image.

At the receiving end, computer systems attempt to extract the data from the form image. The data includes the field values as well as information describing that which the field values represent. For example, the field value of "George" may refer to a first name, a last name, or a street name, and, thus, has an ambiguous meaning. However, when combined with information about the field, the field value of "George" has meaning and is data that may be populated into a database. In order to extract the data, computer systems often rely on being able to identify the type and version of the form. A corresponding template for the type and version of the form is identified and overlaid onto the form. The corresponding template identifies the locations of the reserved space for field values for each field in the form as well as the information represented by the field values.

One area in which forms are widely used is in the financial sector. Specifically, forms are often used to gather financial data to make decisions and file financial reports. The financial sector has thousands of versions and types of forms, which often change at least on a yearly basis. In other words, not only may the version change, but also the form type may change. The change may be minor or may be significant, such as moving the location of fields, removing or adding fields, and changing the requested field values. To manage the changes and to continue to be able to extract data, the corresponding templates are updated. Updating templates involve a human creating and/or proofing the new template. For each form that changes on a yearly basis, a human is involved in updating the form.

SUMMARY

In general, in one aspect, one or more embodiments relate to a method for field extraction from a form image. The method includes identifying a target field of the form image, defining a patch from the form image based on the target field, and encoding the patch using a color encoding scheme to obtain an encoded patch. The method further includes applying a trained classifier to the encoded patch to identify a relationship between a field value and a field identifier, and extracting the field value from the form image according to the relationship.

In general, in one aspect, one or more embodiments relate to a system that includes a data repository comprising a form image, and a computer processor operatively connected to the data repository and configured to execute extraction software. The extraction software is for causing the computer processor to identify a target field of the form image in the data repository, define a patch from the form image based on the target field, and encode the patch using a color encoding scheme to obtain an encoded patch. The extraction software is for causing the computer processor to apply a trained classifier to the encoded patch to identify a relationship between a field value and a field identifier, and extract the field value from the form image according to the relationship.

In general, in one aspect, one or more embodiments relate to a non-transitory computer readable medium for field extraction from a form image. The non-transitory computer readable medium includes computer readable program code for identifying a target field of the form image, defining a patch from the form image based on the target field, and encoding the patch using a color encoding scheme to obtain an encoded patch. The non-transitory computer readable medium further includes computer readable program code for applying a trained classifier to the encoded patch to identify a relationship between a field value and a field identifier, and extracting the field value from the form image according to the relationship.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of the invention generally related to the processing of forms, and, in particular, a form image. A form image is an image of an instance of a form. A form has multiple fields. Each field has a field identifier, a field label, and a field value reserved space for a field value. The field identifier is an identifier of the field that is directly used by the computing system. The field identifier may be an identifier on the form for the field or an identifier assigned by a computing system to the field. In one or more embodiments, the field identifier is unique to the data being requested by the field. In other words, if a field requests a certain item of data, the field identifier for the field may be the same across the multiple forms regardless of the versions or types of forms. A field that requests a different item of data is assigned a different unique identifier. An example of an item of data is an attribute, such as a database attribute. By way of a more specific example, fields on forms that request only a first name may be each assigned the same field identifier whereas a field that requests a full name is assigned a different field identifier than the field identifier of the fields that request first name.

The field label is text displayed on the form that describes the requested data to submit into the corresponding field of the form. The field label may be a text description that describes, in characters, words, phrases, or sentences, the data to enter into the field. In one or more embodiments, the field label is designed to be interpreted by a human. Examples of field labels are "first name" or "Please enter first name" Another example of a field label is "1 Wages, tips, other compensation." The field value reserved space is the space reserved on the form in order to submit data into the form. For example, the field value reserved space may be visually demarcated by a box, a circle for selection, a set of boxes, a comb structure, an underline, or another structure. To a computing system, the field value reserved space on a form image is a set of pixels, which may or may not be contiguous. For example, when scanned, the scanner may only detect a portion of color space as compared to white space of a form. Further, field values in an entered form may be all or in part in the field value reserved space. For example, a user may submit a field value that extends past the field value reserved space in at least one direction.

A form is a definition of an underlying document that requests structured entry of information using field labels and field values. An instance of a form is the document that may have field values entered or may be displayed or printed for a human. For example, a form image is an image of an instance of a form. For conciseness, a form image of a form is an image of an instance of the form. A form may have multiple versions. Each version has a changed field label, change of location of a field (e.g., field value reserved space and/or field label), additional fields, fields removed or a combination thereof. Thus, each version is a separate definition of the underlying document. Further, multiple types of forms exist. Each type may be for a different purpose than other types of forms. Thus, the attributes of the extracted data for different types of forms change at least in part between types.

In general, embodiments of the invention are directed to a template free mechanism to extract data from a form image. One or more embodiments determines the schema of the form at runtime when the data is extracted. The schema relates the field values in the form to the corresponding field identifiers of the field in the form. To determine the schema, one or more embodiments train a classifier using form images that are encoded using a color encoding scheme. The form images used to train the classifier may be the same or different type or version of the form from which data is extracted using the trained classifier. The color encoding scheme provides additional data to the classifier to allow the classifier to classify fields when the field labels are not identical and/or when text cannot be recognized. The color encoding scheme encodes the recognized characters and/or words on the form image into colors.

Without the color encoding scheme, the classifier may search for patterns of characters, which requires the classifier to first recognize each item of text in the form image. Further, the patterns of characters should match prior detected patterns of characters. However, the field labels for the same field identifier may change between forms and some characters may be unrecognizable. A color encoding scheme allows the classifier to only search for patterns of colors and use the patterns of colors along with other data from the form to extract data from the form. By using the color encoding scheme, the computing system is capable of extracting data from forms. Such capability increases the accuracy to make extracting the data from the form image without a template possible for the computing system.

Figure 1:
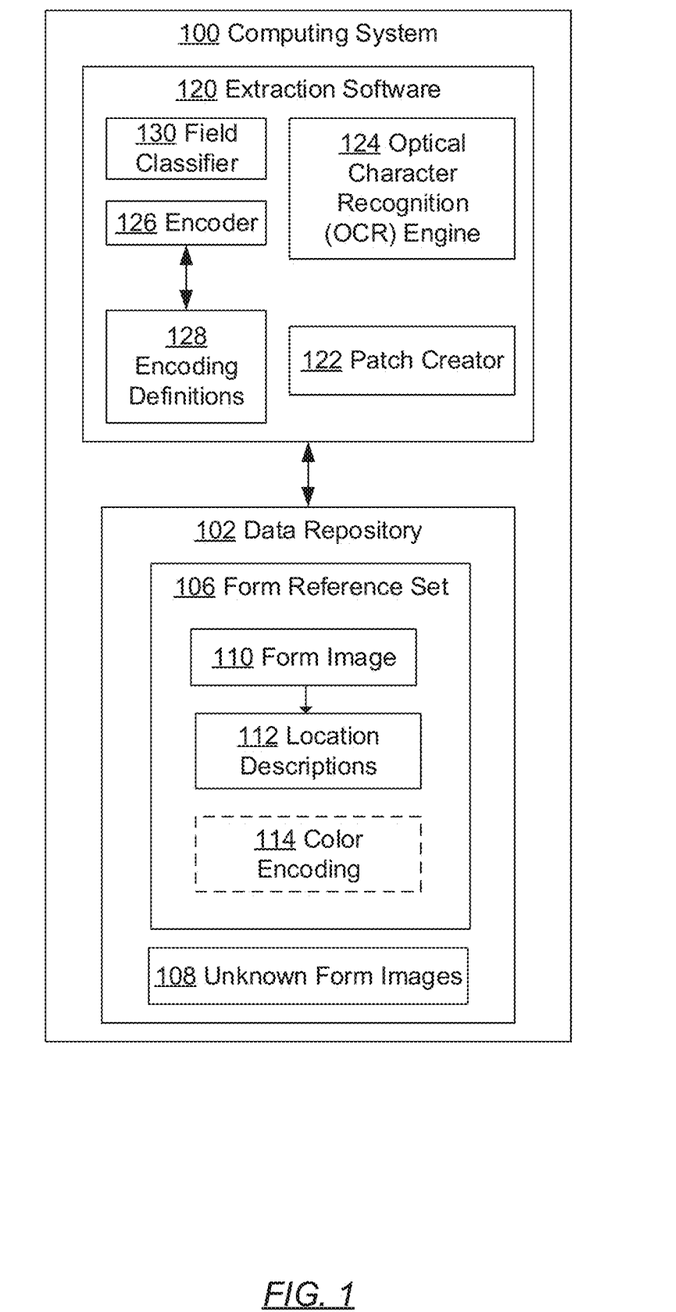
FIG. 1 shows a diagram of a system in accordance with one or more embodiments of the invention.

FIG. 1 shows a diagram of a computing system (100) in accordance with one or more embodiments of the invention. The computing system (100) may correspond to the computing system shown in FIGS. 5A and 5B. In particular, the type, hardware, and computer readable medium for the computing system (100) is presented in reference to FIGS. 5A and 5B. FIG. 1 shows a component diagram of the computing system (100). The computing system (100) includes a data repository (102) and extraction software (120).

In one or more embodiments of the invention, the data repository (102) is any type of storage unit and/or device (e.g., a file system, database, collection of tables, or any other storage mechanism) for storing data. Further, the data repository (102) may include multiple different storage units and/or devices. The multiple different storage units and/or devices may or may not be of the same type or located at the same physical site.

The data repository (102) includes functionality to store a form reference set (106) and unknown form images (108). The form reference set (106) is a set of training information that has the characteristics of a form. For example, the form reference set (106) may include a portion of a form or an entire form. The form reference set (106) includes, for each form image (110), location descriptions (112), and, optionally, a color encoding (114). Specifically, the form reference set (106) may be a training data set having a color encoding (114) or may be used to generate the training data set with the color encoding (114).

A form image (e.g., form image (110), unknown form images (108)) is an image of a form. Specifically, information in the form image is stored as image data (e.g., pixel data) rather than characters. A form image may be a scanned form (e.g., generated using a scanner device), a picture of a form (e.g., generated using a camera), or an image generated using an application. For example, the form image may be a jpeg, tiff, gif, bit map (bmp), portable document format (pdf) image, or another image file format. Although described as a single version of a form, the form image may include multiple pages of a form. A form image may have imperfections as compared to the form. For example, the imperfections may include stray marks (e.g., artifacts from scanning), blurred text, show the form on an angle, have markings from creases or folds in a paper version of the form. The imperfections may cause text and line identification from the form image to have errors in the form of missing or incorrect data (e.g., incorrect characters, missing characters).

The form image (110) in the form reference set (106) may be an entire form or may be part of a form. For example, the form image (110) may be a patch from the form. Patches are described below with reference to patch creator (122). Continuing with FIG. 1, the form image (110) may be a filled in form having field values in field value reserved space for the form.

The form image (110) has corresponding location descriptions (112) in the form reference set (106). Each location description corresponds to a field of the form image (110). The location description (112) specify regions on the form image (110) that are the field value reserved space and the field label, and relates the regions to a field identifier. For example, the regions may be defined using x and y coordinates based on a referenced location (e.g., predefined corner of the form). By way of another example, the location description may include a unique identifier of the pixels in the form image corresponding to the regions. The location description (110) may further include a computer readable text version of the field label for the field. The location description may further include a data type of the field value expected in the field value reserved space. For example, the data type may be alphabetical characters, a date, a month, alpha numerical characters, numerical characters, etc.

The color encoding (114) is an encoding that is applied to the form image (110). In other words, the color encoding relates each unit of information to a color. The color may be in red, green, blue (RGB) color space or other color space. As another example, the color encoding may be in greyscale having varying levels of grey between black and white. In one or more embodiments, the color encoding scheme assigns a color to each character detected in the form image. In one or more embodiments, the color encoding may assign a color to each word or predefined collection of characters extracted from the form image. By using a color encoding, the classifier does not focus on individual characters, which are represented as pixels to the classifier, and the imperfections in the form image are hidden.

In one or more embodiments, the color encoding may be as follows. Each single identified field label on the form may be related to a single color bar in the color encoding. The color bar may have multiple color slices (i.e., slices of a single color). A portion of the color slices may encode spatial information (i.e., spatial information slices) of the field label while another portion encodes character values (i.e., character information slices) of the fields. For example, the spatial information slices may demarcate the location of the field (e.g., in X,Y coordinates with area, identifying the two or more corners of the field labels, or using another technique to denote the portion of the form corresponding to the field label). The character information slices encode the characters on the form image. The character information slices may be in a one to one relationship with characters. By way of another example, the character information slices may be in a one to many relationship with characters (e.g., a single slice representing a word, a phrase, a label, etc.).

Continuing with the data repository (102), the unknown form images (108) are form images in which the schema is unknown. Specifically, the unknown form images (108) are the form images that are the target for data extraction using a trained classifier. The unknown form images (108) may be stored in whole or in part in the data repository (102). For example, the unknown form images (108) may be batch processed once a collection of form images is received. By way of another example, the unknown form images (108) may be processed while the unknown form images are received by the computing system. The unknown form images (108) may have lower quality of image capture than the form reference set. For example, the unknown form images (108) may have more blurriness, more imperfections than the form reference set (106). Further, the unknown form images (108) may have at least some field values shown in the field value reserved space of fields. The unknown form images (108), when received, may have minimal or no computer readable information describing the form image. Computer readable with respect to the form refers to each alphanumeric character or symbol character having an assigned value (e.g., ASCII encoding) rather than pixel locations being identified. For example, minimal information may be provided in the form of a filename of the image form, metadata associated with the file, or a prespecified record that is related, in storage, to the form image (e.g., a database record of a customer that provided the form image, a record of a financial transaction that is connected to the form image). The minimal information may not be in the content of the form image file.

Extraction software (120) is communicatively connected to the data repository. For example, the extraction software (120) may be a standalone software application, a part of another software application, or a plugin to another software application. By way of a more specific example, the extraction software (120) may be a part of a financial management application. As another example, the extraction software (120) may be communicatively connected to or a part of a database application to update a database. The extraction software includes functionality to extract data from form images. In particular, the extraction software includes functionality to identify the schema for the form during runtime to determine relationships between field values and field identifiers of the fields in the form. The extraction software may further be configured to extract the data and populate a storage repository (e.g., data repository) using the relationships. The data extracted may be the field values and/or processed data that includes computational results using inputs of the field values. Extraction software includes a patch creator (122), an optical character recognition (OCR) engine (124), an encoder (126) with encoding definitions (128), and a field classifier (130).

The patch creator (122) includes functionality to create patches from a form image. A patch is a contiguous section of the form image. Patches may be overlapping. Each patch has a centroid of a field. In other words, the patch is defined for a specific field, which is the target of the patch. The centroid may be the field label or the field value reservation space, or a combination thereof. The centroid may be in the center of the patch or may be skewed to a side of the patch based on the size of the patch and the position of the centroid with respect to the form. In one or more embodiments, to the extent possible for a given centroid, the centroid is located in the middle of the patch. However, for example, if the centroid is close to the edge of the form, then the centroid may not be in the middle of the patch, but rather closer to the edge and the patch may extend farther in an opposing direction.

Figure 4A:
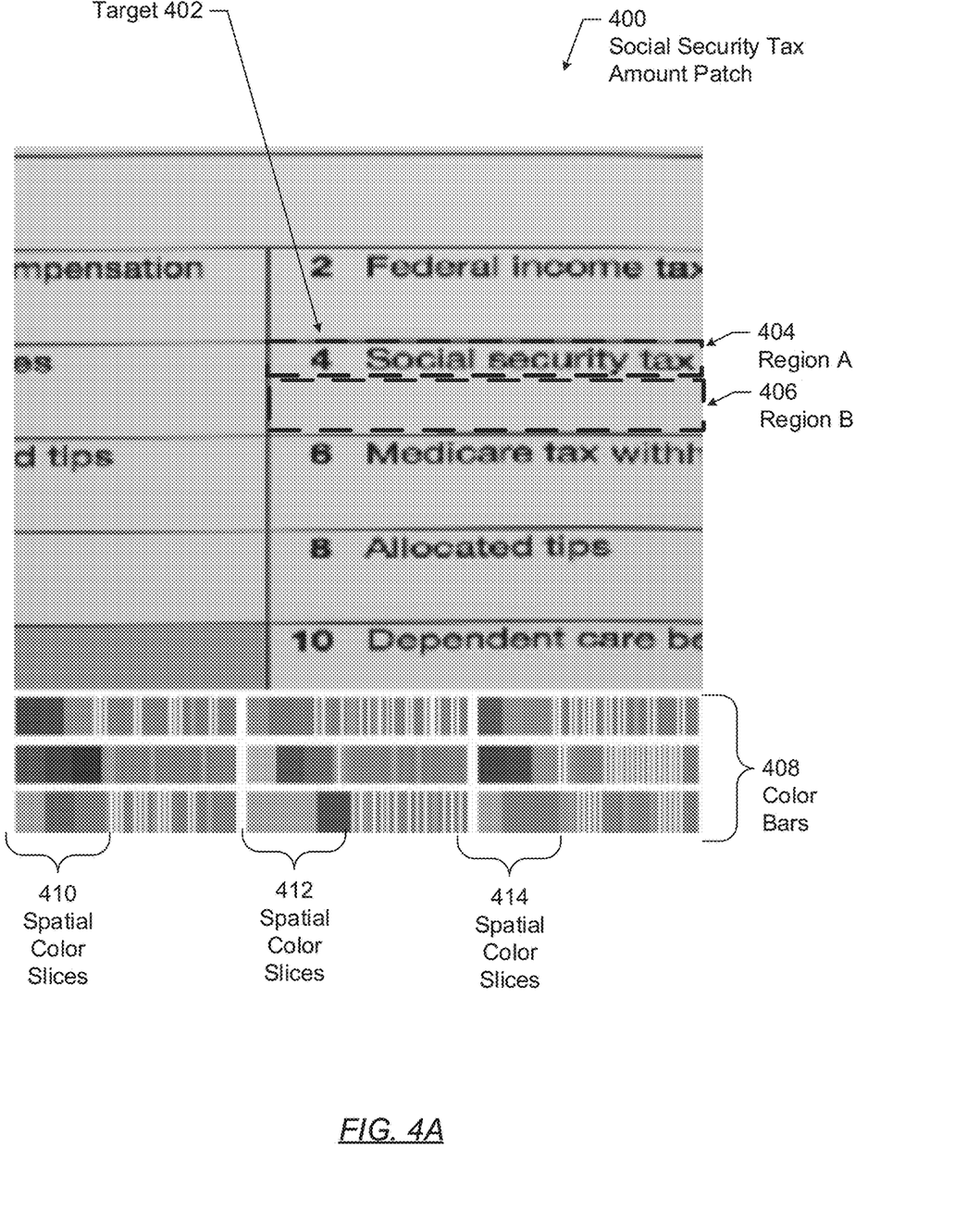
FIGS. 4A, 4B, and 4C show examples in accordance with one or more embodiments of the invention.
Figure 4B:
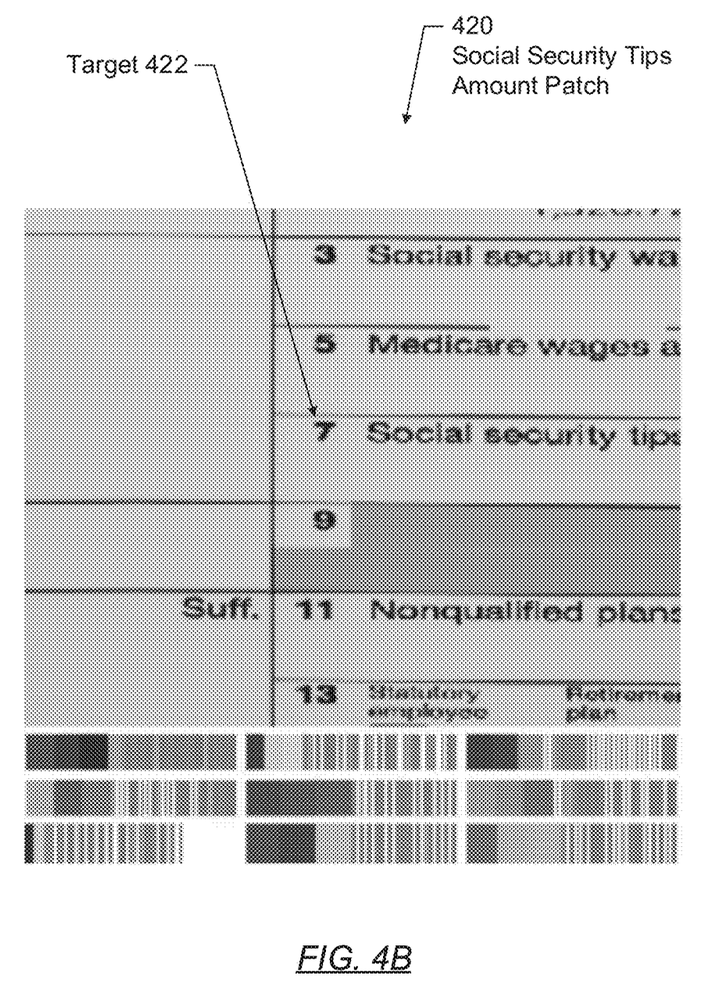
Figure 4C:
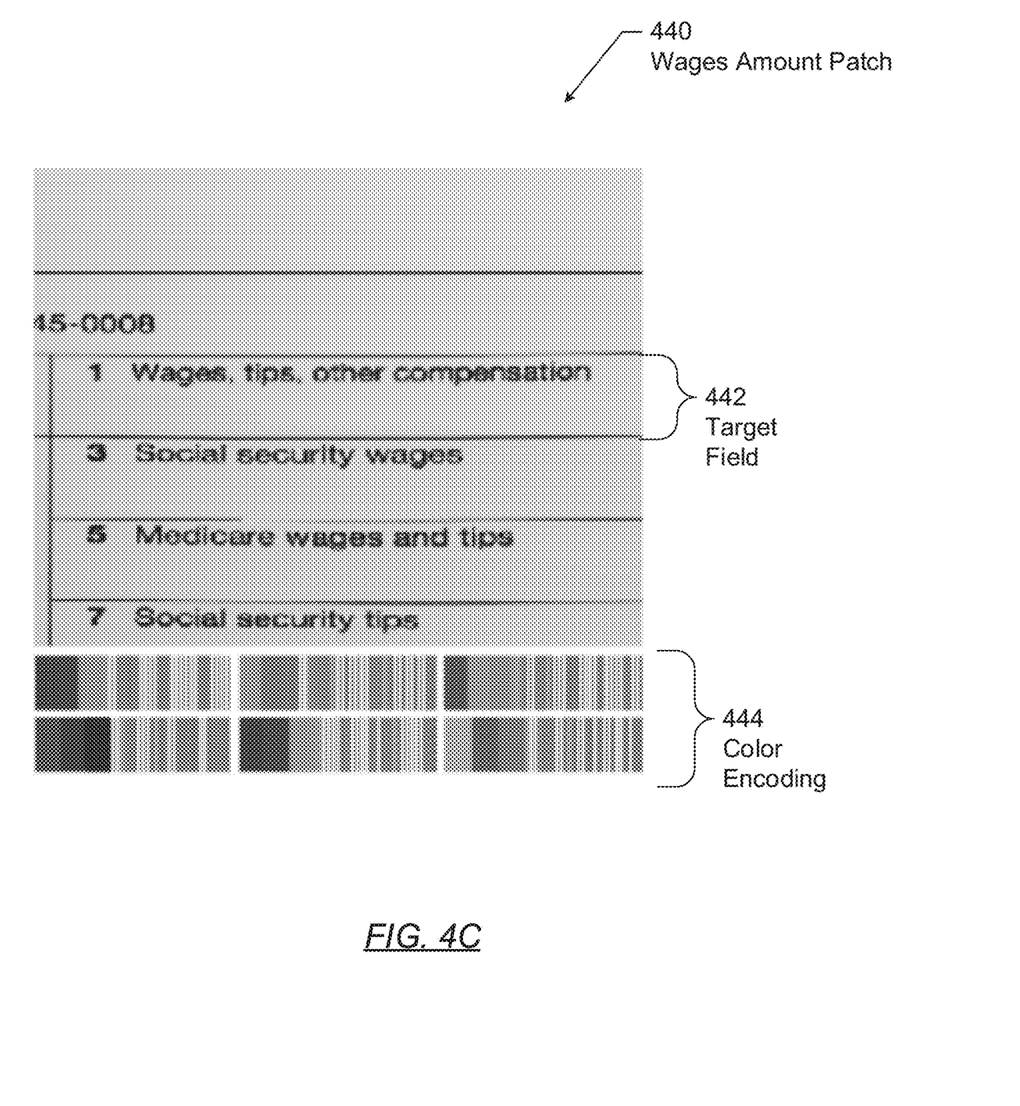

In one or more embodiments, patches have a uniform size in the form image. The uniform size may be defined based on a number of inches or other unit of measurement. In other words, the uniform size may be the same percentage of the form image regardless of the pixels resolution of the patch. As another example, the uniform size may be defined based on the number of pixels and may be a varying percentage of the form image. FIGS. 4A-4C show example patches.

Continuing with FIG. 1, the OCR engine (124) includes functionality to recognize text based on the values of the pixels in the patch. The OCR engine (124) may recognize individual characters without regard to neighboring characters in some embodiments. In some embodiments, the OCR engine (124) is a natural language OCR engine (124) that attempts to recognize words and sentences from the values of pixels based on a predefined dictionary of words and phrases. The OCR engine may be imperfect in that the OCR engine may be unable to correctly detect blurred characters, detect characters that have neighboring stray marks, or other errors in the form image. Other problems with the form image may cause the OCR engine to unable to correctly identify characters. However, because embodiments use color patterns rather than character patterns, one or more embodiments operate with an imperfect character recognition.

Continuing with FIG. 1, the encoder (126) includes functionality to encode the form image. The encoding adds input to the classifier. In one or more embodiments, multiple encodings are performed. A first encoding changes characters to an ordinal value of the character for the second encoding. For example, the first encoding may be a hexadecimal encoding that relates each character to a hexadecimal value. The second encoding encodes the hexadecimal value into colors. The encoder (126) is connected to encoding definitions (128). The encoding definitions (128) may be in the instructions of the encoder (126) or separate from the encoder (126). For example, the encoding definitions may be a set of rules that specify a relationship between each character type and each color value. The relationship may be a one-to-one relationship.

In one or more embodiments, the encoding definitions (128) may span multiple natural language families (e.g., IndoEuropean language family, Chinese languages, etc.). In such a scenario, a specified red color may be related to the "n" character regardless of the language of the form image. In other embodiments, the encoding definitions are on a per language or per language family basis. In such a scenario, a specified red color may be related to the "n" character in English, and a zhe in Cyrillic.

The field classifier (130) includes functionality to classify fields and identify a schema from form images. The field classifier (130) is a classifier that applies machine learning to determine the schema of a form image during runtime. Specifically, the field classifier (130) is configured to identify relationships between field identifiers and field values in the form image of a form even when the classifier has not been provided with the same version or even type of form. In one or more embodiments, the classifier is a convolution neural network (CNN) classifier. Other types of classifiers may be used in one or more embodiments. For example, a k nearest neighbor classifier or support vector machine (SVM) classifier may be used.

While FIG. 1 shows a configuration of components, other configurations may be used without departing from the scope of the invention. For example, various components may be combined to create a single component. As another example, the functionality performed by a single component may be performed by two or more components.

Figure 2:
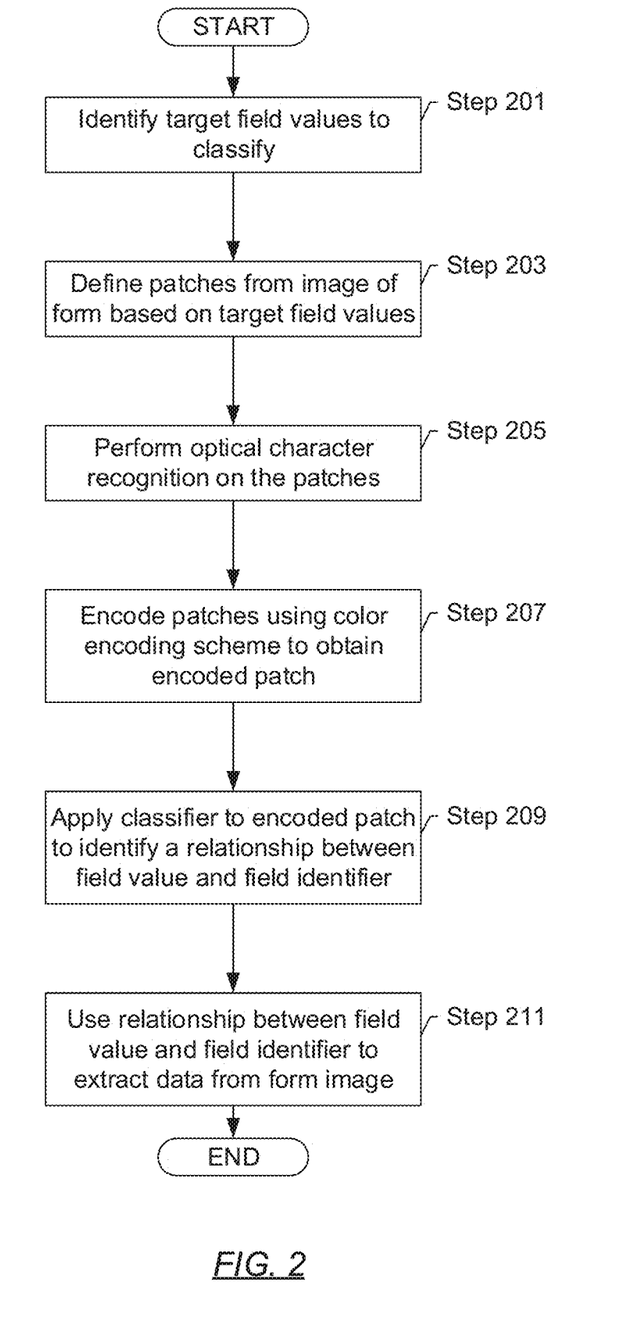
FIGS. 2 and 3 show flowcharts in accordance with one or more embodiments of the invention.
Figure 3:
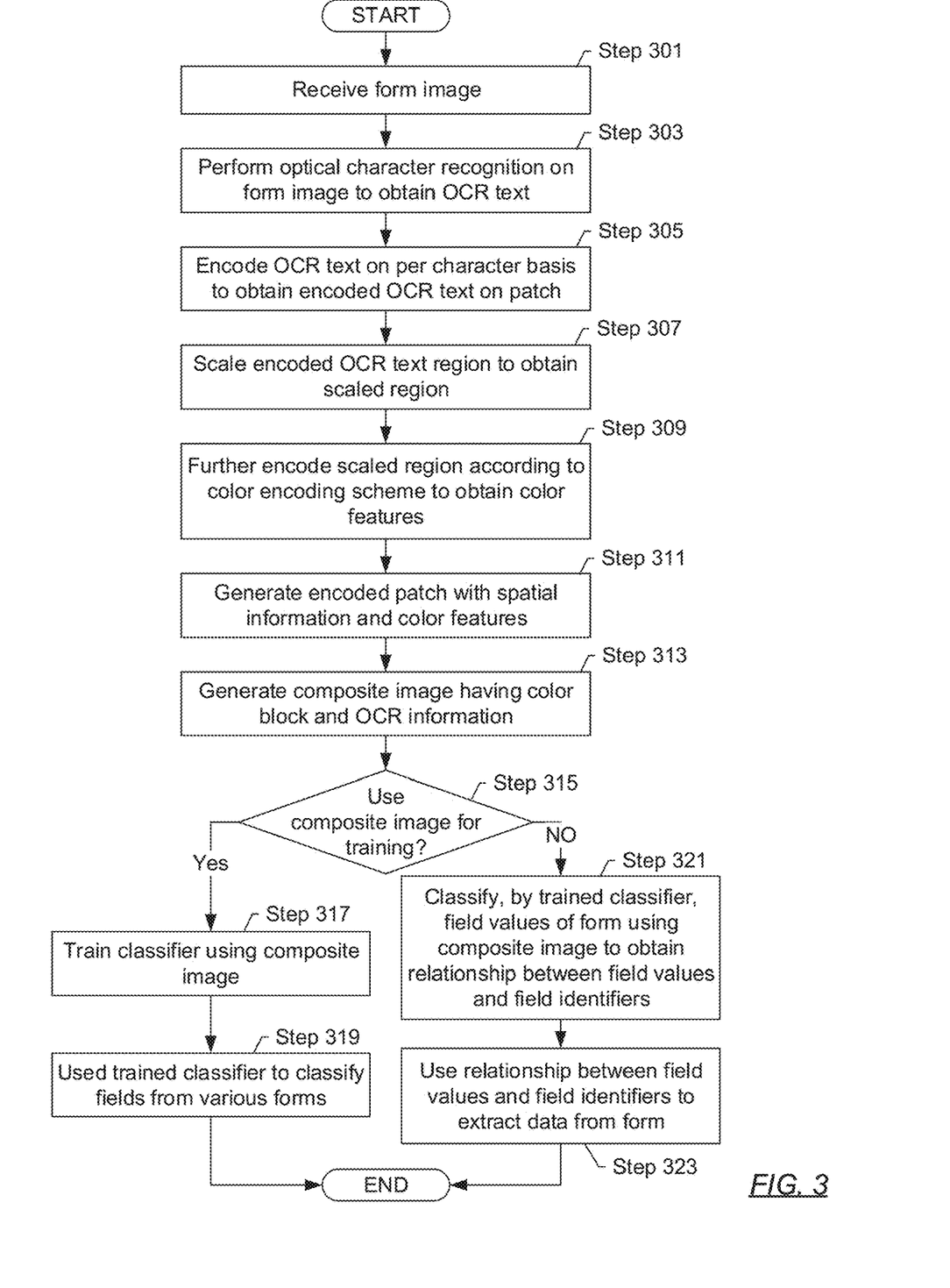

FIGS. 2 and 3 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention. The steps of FIGS. 2 and 3 may be performed by the components of the computing system shown in FIGS. 1, 5A, and 5B.

FIG. 2 shows a flowchart to extract data from a form image in accordance with one or more embodiments of the invention. In Step 201, one or more target fields to classify are identified in accordance with one or more embodiments of the invention. In some embodiments, each location having recognizable text are identified as being possible target fields. In such a scenario, field values and field labels may be selected as target fields. Optical character recognition may be used to identify location of field values and field labels in the form image by determining which pixels correspond to a character. The remaining pixels may be deemed to correspond to a geometric shape that is not a recognizable character.

In one or more embodiments, identifying target fields may be performed by identifying a variation in font of characters in the form image. For example, the field labels may have a clear uniform font across the field labels that is computer generated. The field values may be handwritten and not as clear to a computer. In such an embodiment, an OCR engine may be employed to detect the characters and the variation between the fonts of the characters.

In one or more embodiments, identifying target fields to classify may be performed by determining the location of the field values of the target fields. For example, the location of the field value may be determined by identifying the location of field value reserved space based on the pixels (e.g., based on the detectable geometric shapes in the form image). For example, field value reserved space may be demarcated lines forming a box or comb structure in the form. The box, comb structure, or other demarcation may be composed of lines that are skewed and may have some discontinuity in the form image. With the imperfections of the form image, the lines demarcating the field value reserved space may be identified based on satisfying certain criteria, such as length, threshold shape, etc.

In one or more embodiments, the target field values are not separately identified. For example, the form image may be divided into patches without accounting for the specific location of target fields. In such a scenario, patches may be defined such that a greater amount of overlap exists between patches. The amount of overlap is the amount of area of the form image that is included in multiple patches. The greater amount of overlap between the patches allows for at least some of the patches to be centered on a target field. Some of the patches may be discarded, such as when the output of the classifier for a patch is indeterminate (e.g., the output probabilities of the multiple classes being within a threshold amount to each other indicating that the classifier cannot correctly identify the class based on the patch).

In Step 203, patches from the image of the form are defined based on the target field values in accordance with one or more embodiments of the invention. In one or more embodiments, patches extend outward from the centroid. The centroid is the center of the location denoted as the target field. In one or more embodiments, the patch extends in equal amount outwards from the center in at least two directions (e.g., equal amount outward in the x and y direction, where x extends along the width of the form and y extends along the length of the form). If extending the patch in a direction extends the patch past the edge of the form image in that direction, then the patch may be extended in an opposing direction. For example, if the target field is next to the edge of the form image, then the target field may be next to or near the edge of the patch rather than in the middle of the patch.

In Step 205, OCR is performed on the patches in accordance with one or more embodiments of the invention. For example, if OCR is not performed as part of Step 201 on the entire form image, OCR may be performed on individual patches of the form image. As another example, the OCR performed in Step 201 may be performed on a copy of the form image having a lower resolution. While the lower resolution decreases accuracy, the level of accuracy may be sufficient to identify target fields. The individual patches may have a greater resolution. The OCR may be performed on the individual patches to identify characters in the individual patches. The output of the OCR engine may be the ASCII values, Unicode, or other code of the characters and the locations of the characters in the form image.

In Step 207, patches are encoded using a color encoding scheme to obtain an encoded patch. Patches are encoded by applying the encoding definition for color to the patch. Each character and/or word identified by the OCR engine may be encoded with a distinct color value. The color value encoding may be a line shape, or a box shape for the character. In one or more embodiments, the color encoding creates uniform color shapes regardless of the character being encoded. Specifically, each character is encoded with the same size filled box or line regardless of the size or number of pixels in the character. In one or more embodiments, the character does not change color without similarly changing the color of one or more of the neighboring pixels. The encoding creates an image layer of color for the patch.

In Step 209, a classifier is applied to the encoded patch to identify relationships between field values and field identifiers. The classifier is configured to identify patterns in colors. The classifier may classify the color patterns in the form image based on the color patterns in the form image matching, within a threshold degree of freedom, color patterns of previously identified field labels. The color patterns of previously identified field labels are related by the classifier to field identifiers. Using the match, the classifier may detect which field labels in the form image correspond to which field identifiers.

The classifier may further identify field values based on geometric shapes detected by the classifier that demarcate field value reserved space. Further, the classifier may identify field values based on the color encoding of field values not matching previously identified color encodings of field labels. The classifier may further relate the field values to the field labels based on detected patterns of how the field identifiers match to field value reserved space and the location of the field values. By identifying unique relationships on the form between the field values and the field labels and the field labels to the field identifiers, by transitive property, the field values are related to the field identifiers.

A CNN classifier may be trained to operate specifically on images having color values. A CNN classifier is a neural network that operates similar to other neural networks, and has a convolution layer at the beginning. The image is a matrix of pixels values. The color encoding scheme described in one or more embodiments adds additional pixel values to the image to provide an additional layer on which the classification may be based.

The convolution layer applies a filter matrix to each portion of image to create a feature map covering the portions of the image. Applying the filter matrix may be performed by calculating a dot product between a matrix having pixel values of the image and the filter matrix. The value of the dot product is stored in a location of the feature map corresponding to the portion. Different filter matrices may be applied to create multiple feature maps. Spatial pooling may be applied to reduce the size of the feature map, such as by calculating an average, maximum value, sum, etc., of a subset of values of the feature map and replacing the subset with the single value. The CNN uses the multiple feature maps to determine output probabilities for each class of the classification, and then selects a class based on training data of feature maps and the output probabilities. In one or more embodiments, the classification is the field identifier for the field label and the location of the field value with respect to the field label for the field.

When a CNN classifier is used for text, the CNN classifier may be solely trained or optimized for text. For a CNN classifier that is not solely trained or optimized for text, even when the OCR engine passed the CNN classifier character values, the CNN classifier may not consider the underlying values. Rather, such a CNN classifier focuses on field schematization rather than discerning particular characters. By adding the color encoding to the form image in disclosed embodiments, the CNN classifier is not detecting which pixels belong to which characters in the form image or using underlying character encoding, but rather based on visual cues of color overlaid to the form image.

In Step 211, the relationship between the field value and field identifier is used to extract data from the form image. Specifically, OCR recognized text of the field values on the form image is identified and related to the field identifiers as determined by the classifier. The OCR recognized text may be the extracted data or may be used to extract data. For example, the OCR recognized text of the field values may be extracted and related to the field identifier when stored. By way of another example, the extracted data may be interpreted from the OCR recognized text. For example, the field identifier may correspond to a selection box for "married filing jointly." The OCR recognized text of the field value may be the check mark or x mark selecting the box for the field. In the example, the extracted data is that "married filing jointly" is true (i.e., selected). By way of another example, field values that are separate for first name, middle name, and last name may be concatenated into a single data value of name when extracted from the form image. Other techniques for extracting data may be used.

FIG. 3 shows a detailed flowchart in accordance with one or more embodiments of the invention. One or more of the Steps of FIG. 3 may be performed in addition to or as an alternative to the Steps of FIG. 2.

In Step 301, a form image is received. Specifically, the form image is transmitted to or created by the computing device. The form image may be received from a scanning machine or camera that is directly or indirectly attached to the computing device. By way of another example, the form image may be created by a program. The form image may be received via a network, such as uploaded into a web application (e.g., a financial management web application). As another example, the form image may be stored with a set of form images in the data repository for batch processing.

In Step 303, OCR is performed on the form image to obtain OCR text. The OCR may be performed as discussed above with reference to FIG. 2. The output of the OCR is a character encoding of the form image, such as Unicode, ASCII or other textual encoding of the form image.

In Step 305, the OCR text is encoded on a per character basis to obtain encoded OCR text on the patch. The encoding in Step 305 may be a first encoding of the characters to prepare for a later encoding. For example, characters may be assigned an ordinal value or a hexadecimal value. The hexadecimal value assigned to a character may correspond to a color value that is translated into RGB color space. By way of an example, a character may be encoded using six hexadecimal characters. In the example, the first two hexadecimal characters is red, the second two hexadecimal characters are green, and the last two hexadecimal characters are blue. The mapping between the text characters and the hexadecimal characters may be implementation specific and virtually any mapping may be used. In some embodiments, the encoding in Step 305 is to map to a greyscale color space rather than RGB color space.

The encoding of Step 305 of FIG. 3 may be performed in addition to the textual encoding by the OCR engine and may not be interpretable outside of the extraction software. In other words, the encoding of Step 305 does not encode characters according to a defined standard, but rather encodes the characters to a value to match a color.

In Step 307, the encoded OCR text region is scaled to obtain a scaled region. The scaling adjusts the resolution of the form image to match a predefined resolution. For example, if the form image is at greater resolution than a predefined resolution, then downscaling is performed to decrease the resolution. If the form image has lower resolution, then upscaling may be performed. The scaling of Step 307 allows the classifier to operate at a standard preset resolution across the form image reference set and the unknown form images.

In Step 309, the scaled region is further encoded according to the color encoding scheme to obtain color features. For example, each character that is encoded in Step 305 is further encoded into color space to become a color feature.

In Step 311, an encoded patch is generated with the spatial information and the color features. The color features in Step 311 are related to the location of the character on the patch forming an encoded patch having a color block of multiple colors encoded.

In Step 313, a composite image having a color block and OCR information is generated. The composite image applies the color block (i.e., color features of the encoding at the spatially defined location) to the original form image or to the original patch with only OCR recognition. The result is a merging of patch contents of the OCR with the color information. The composite image that is output from Step 313 may be a single patch or may be an entire form image, or a sub-region of the form image spanning multiple patches.

In Step 315, a determination is made whether to use the composite image for training. The determination may be based on whether the composite image is part of the form reference set. In other words, the determination is made based on whether the field identifiers for fields in the composite image are known. In one or more embodiments, the classifier uses supervised learning. Thus, the information used to train the classifier is accurate. Accordingly, if additional information exists for the composite image (e.g., actual field labels, location descriptions, and form identifiers), then the composite image may be used to train the classifier.

In Step 317, the classifier is trained. The training of the classifier allows the classifier to statistically related different patterns of encodings along with other information from the composite image to field identifiers and locations of field values. The classifier may be trained with several thousand form images (e.g., eight thousand) for multiple types and versions of the forms. The particular type and version may not be distinguished by the classifier. In other words, identifiers of the type and version of the form may not be used to train the classifier or to classify the form image in accordance with one or more embodiments of the invention.

In Step 319, the trained classifier is used to classify fields from various forms. To classify fields of various form images, the Steps of FIG. 2 and/or various Steps of FIG. 3 may be performed.

Returning to Step 315, if a determination is made not to use the composite image for training, then the flow proceeds to Step 321 of FIG. 3. In Step 321, the field values of the form are classified by the trained classifier using the composite image to obtain a relationship between field values and field identifiers. The relationship is used in Step 323 to extract data from the form. Steps 321 and 323 may be performed in a same or similar manner as Steps 209 and 211 of FIG. 2 discussed above.

FIGS. 4A, 4B, and 4C show examples patches and corresponding color encoding for the form image reference set in accordance with one or more embodiments of the invention. The following examples are for explanatory purposes only and not intended to limit the scope of the invention.

Turning to FIG. 4A, FIG. 4A shows a social security tax amount patch (400). Specifically, the target (402), or centroid, is the social security tax amount field. The target (402) of the patch is shifted to the top of the patch because the patch is located adjacent to the top of the form. Because the patch is used to train a CNN classifier, location descriptions are included with the patch. The location descriptions identify the region A (404) as corresponding to the field label and region B (406) as corresponding to the field value reserved space.

The color features are in color bars (408) shown underneath the patch (400). The color bars are the color encoding of the OCR recognized text on the patch. The color bars may further encode additional information such as the lines and locations of the characters. Nine color bars are shown in a three by three grid. The nine color bars under the patch correspond one to one with the identified labels found within the patch. Each color bar (408) includes multiple color slices having an individual color in RGB color space. Specifically, the color slices together form a color bar. In the example, each of the color bars represents a single identified label encoded in a RGB color space. The three larger slices (e.g., spatial color slices (410, 412, 416)) on the leftmost side of the corresponding color bar represent spatial information. The leftmost slice of the spatial color slice (410) is an X centroid coordinate. The middle slice of the spatial color slice (410) is an Y centroid coordinate. The rightmost slice of the spatial color slice (410) is the area of the field.

The remaining slices reference the characters in the label. The slices form the color bar. The actual encoding of the colors use a simple scale to consistently associate a color with a particular integer. The scale is determined to some extent by the range of integers to be scaled, allowing for obvious visual discrimination. Although the example shows using a scale, other examples may be used where hashes are used against known labels. The assigning of hashes, assigns a single color to the label, as opposed to individually assigning colors to each of the characters found.

FIG. 4B shows an example social security tips amount patch (420). FIG. 4B applies a similar encoding scheme as FIG. 4A. The target of the patch is the social security tips amount field (422). Segmentation has been used in the past to partition images into different fields. Segmentation is the process of cropping fields around the fields such that only and all of the single field is in the segment. However, segmentation is challenging when the template is undefined as segmentation relies on knowledge of which field value reserved space is associated with which field and the location and extent of the field labels. In one or more embodiments, patches are defined based on simple geometry and identifying a target location of a target field. Because one or more embodiments use color encoding rather than text encoding on patches, exact segmentation is not required in one or more embodiments. In other words, although the target field is cut off in the patch such that a portion (i.e., characters "s amount", where s is at the end of tips) of the target field is not in the patch, the patch may still be used to train the classifier and identify target fields for forms that request social security tips amount. As with FIG. 4A, color features (424) are shown at the bottom of the patch and encode the patch.

FIG. 4C shows an example of a wages amounts patch (440). FIG. 4C uses a similar encoding scheme as FIG. 4A. The wages amount patch (440) is a patch for wages, tips, and other compensation target field (442). In FIG. 4C, the portion of the target field that is in the middle of the patch is in the middle of the target field. Further, color encoding (444) is shown at the bottom of the patch. The color encoding encodes the values of the characters of the patch into a color encoding scheme. Using the color encoding, the CNN classifier may be trained based on patterns of colors rather than individual pixels or text. Because the CNN classifier is better adapted at analyzing color rather than pixel level analysis, the CNN classifier may be more accurate at identifying the schema of the form image during runtime.

Figure 5A:
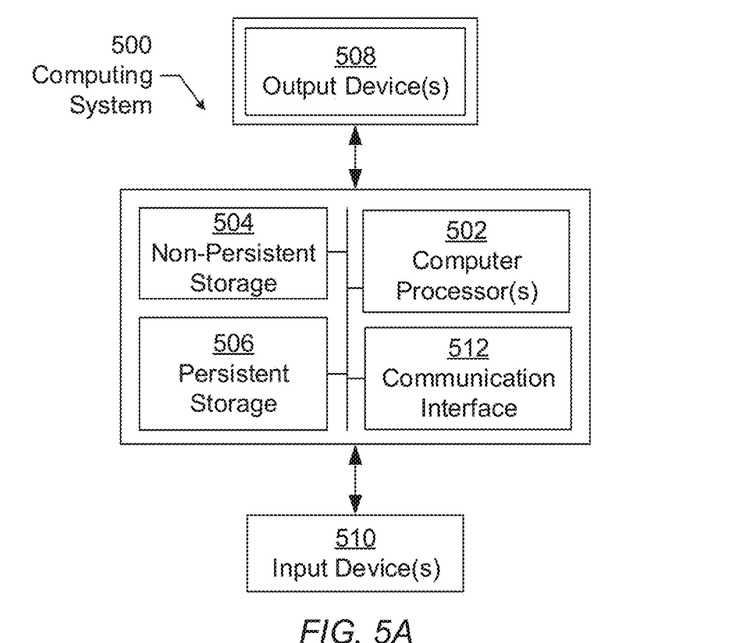
FIGS. 5A and 5B shows a computing system in accordance with one or more embodiments of the invention.

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) (502) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 5B:
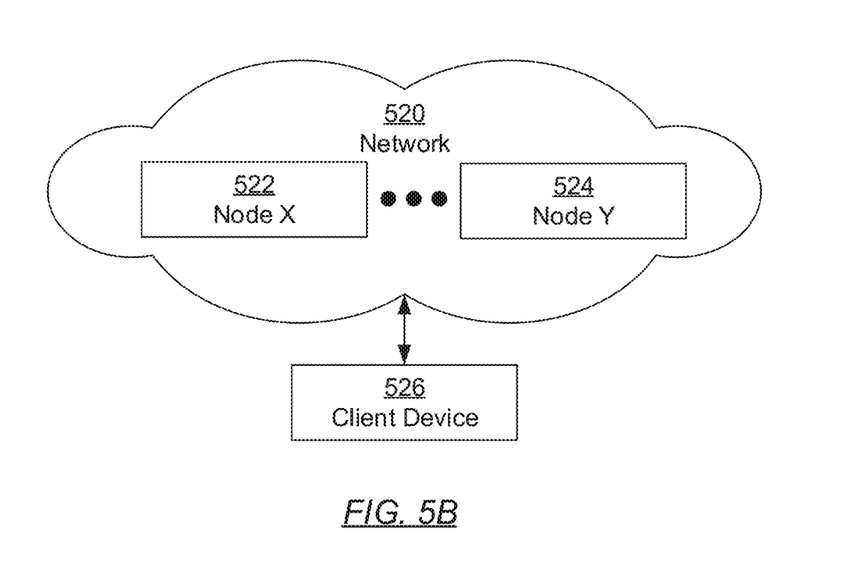

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for field extraction from a form image, comprising:
    identifying a target field of the form image;
    defining a patch from the form image based on the target field;
    encoding the patch using a color encoding scheme to obtain an encoded patch;
    applying a trained classifier to the encoded patch to identify a relationship between a field value and a field identifier; and
    extracting the field value from the form image according to the relationship.

2. The method of claim 1, further comprising:
    performing an optical character recognition (OCR) on the patch to identify text in the patch,
    wherein the color encoding scheme is applied on the text in the patch.

3. The method of claim 2, wherein the color encoding scheme is applied on a per character basis on the text.

4. The method of claim 2, wherein the color encoding scheme is applied on a per word basis on the text.

5. The method of claim 1, further comprising:
    identifying a plurality of target fields of the form image, wherein the target field is in the plurality of target fields;
    defining a plurality of patches from the form image based on the plurality of target fields, wherein the patch is in the plurality of patches, and wherein the plurality of patches is overlapping;
    individually encoding the plurality of patches using the color encoding scheme to obtain a plurality of encoded patches;
    combining the plurality of encoded patches into a composite image; and
    applying the trained classifier to the composite image.

6. The method of claim 1, further comprising:
    performing OCR on the form image to obtain OCR text;
    encoding the OCR text on a per character basis to obtain encoded OCR text on the patch; and
    scaling the patch to obtain a scaled patch, wherein the scaled patch is encoded using the color encoding scheme to obtain a plurality of color features.

7. The method of claim 6, wherein scaling the patch creates a uniform patch size.

8. The method of claim 6, wherein encoding the OCR text is performed by matching each character in the OCR text with an ordinal number value.

9. The method of claim 6, further comprising:
generating the encoded patch with spatial information of the plurality of color features.

10. The method of claim 9, further comprising:
generating a composite image comprising the encoded patch and the OCR text, wherein the trained classifier is applied to the composite image.

11. The method of claim 1, further comprising:
training a classifier using a form reference set, the form reference set comprising a plurality of types of a plurality of forms to obtain the trained classifier.

12. A system comprising:
a data repository comprising a form image; and
a computer processor operatively connected to the data repository and configured to execute extraction software, the extraction software for causing the computer processor to:
identify a target field of the form image in the data repository, define a patch from the form image based on the target field,
encode the patch using a color encoding scheme to obtain an encoded patch;
apply a trained classifier to the encoded patch to identify a relationship between a field value and a field identifier, and
extract the field value from the form image according to the relationship.

13. The system of claim 12, wherein the extraction software further causes the computer processor to:
perform an optical character recognition (OCR) on the patch to identify text in the patch,
wherein the color encoding scheme is applied on the text in the patch.

14. The system of claim 12, wherein the extraction software further causes the computer processor to:
perform OCR on the form image to obtain OCR text;
encode the OCR text on a per character basis to obtain encoded OCR text on the patch; and
scale the patch to obtain a scaled patch, wherein the scaled patch is encoded using the color encoding scheme to obtain a plurality of color features.

15. The system of claim 14, wherein the extraction software further causes the computer processor to:
generate the encoded patch with spatial information of the plurality of color features.

16. The system of claim 15, wherein the extraction software further causes the computer processor to:
generate a composite image comprising the encoded patch and the OCR text, wherein the trained classifier is applied to the composite image.

17. A non-transitory computer readable medium for field extraction from a form image, the non-transitory computer readable medium comprising computer readable program code for:
identifying a target field of the form image;
defining a patch from the form image based on the target field;
encoding the patch using a color encoding scheme to obtain an encoded patch;
applying a trained classifier to the encoded patch to identify a relationship between a field value and a field identifier; and
extracting the field value from the form image according to the relationship.

18. The non-transitory computer readable medium of claim 17, further comprising computer readable program code for:
identifying a plurality of target fields of the form image, wherein the target field is in the plurality of target fields;
defining a plurality of patches from the form image based on the plurality of target fields, wherein the patch is in the plurality of patches, and wherein the plurality of patches is overlapping;
individually encoding the plurality of patches using the color encoding scheme to obtain a plurality of encoded patches;
combining the plurality of encoded patches into a composite image; and
applying the trained classifier to the composite image.

19. The non-transitory computer readable medium of claim 17, further comprising computer readable program code for:
performing OCR on the form image to obtain OCR text;
encoding the OCR text on a per character basis to obtain encoded OCR text on the patch; and
scaling the patch to obtain a scaled patch, wherein the scaled patch is encoded using the color encoding scheme to obtain a plurality of color features.

20. The non-transitory computer readable medium of claim 17, further comprising computer readable program code for:
training a classifier using a form reference set, the form reference set comprising a plurality of types of a plurality of forms to obtain the trained classifier.

* * * * *